UNITED STATES PATENT OFFICE.

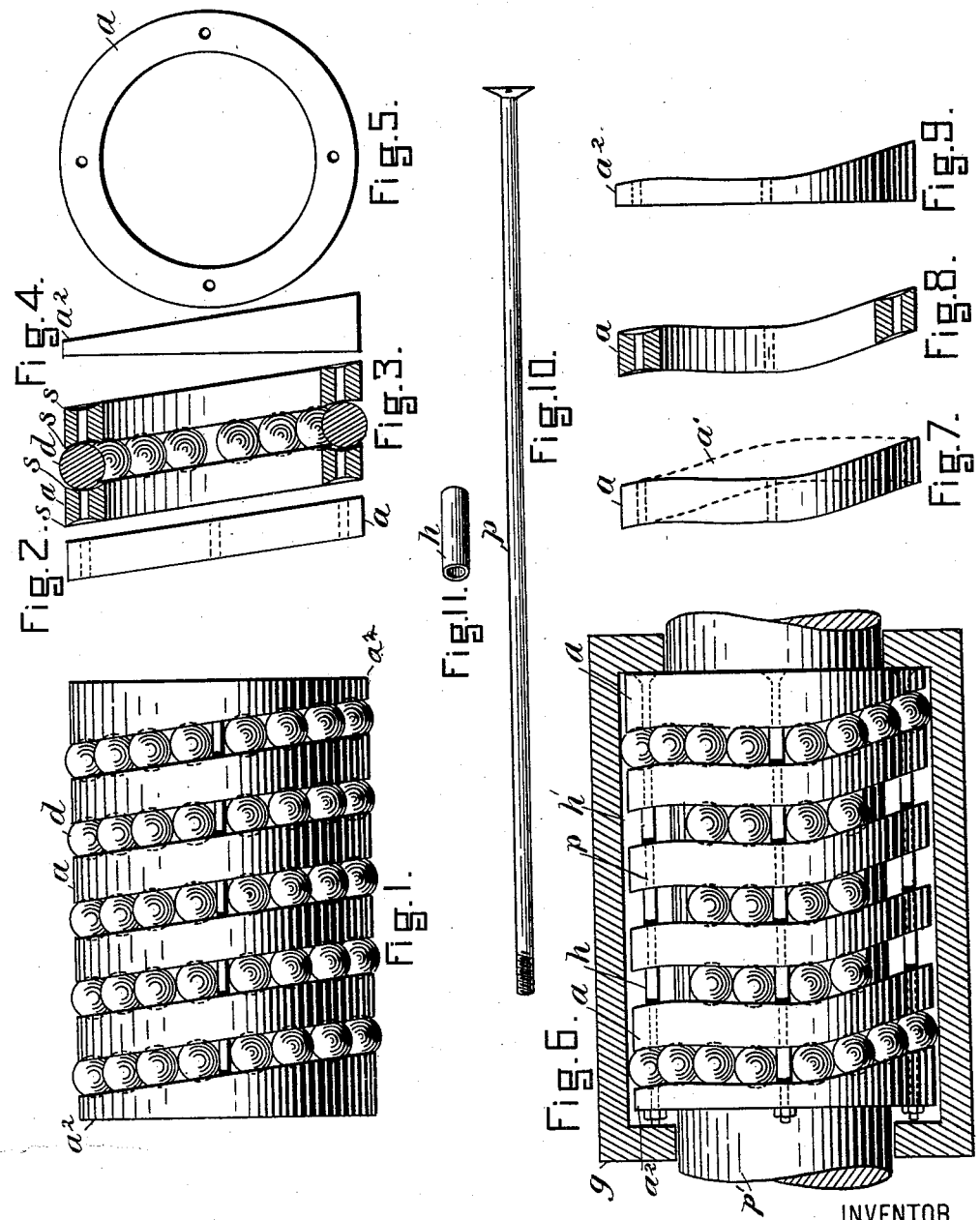

HENRY HOWARD, OF PROVIDENCE, RHODE ISLAND.

BALL-BEARING.

SPECIFICATION forming part of Letters Patent No. 454,049, dated June 16, 1891.

Application filed October 22, 1890. Serial No. 368,942. (No model.)

*To all whom it may concern:*

Be it known that I, HENRY HOWARD, of Providence, in the county of Providence and State of Rhode Island, have invented certain new and useful Improvements in Ball-Bearings; and I do hereby declare that the following is a full, clear, and exact description thereof, reference being had to the accompanying drawings, and to the letters of reference marked thereon, which form a part of this specification.

This invention relates to devices connected with the use of balls in bearings for the purpose of lessening the friction, as set forth in the United States Letters Patent No. 439,877, dated November 4, 1890, this being an improvement on the invention described in that application. It is fully illustrated in the accompanying drawings.

Figure 1 is an elevation of one of the cases for containing and controlling the balls both when they are in and when they are out of the bearing, with the balls inclosed. Fig. 2 is an edge view of one of the rings of the series composing the body of the case. Fig. 3 shows a vertical section of two of the rings shown in Fig. 2, with balls between them. Fig. 4 is an edge view of one of the end rings. Fig. 5 is a face view of one of the rings. Fig. 6 is an elevation of a case with balls, in which the rings are curved instead of being flat across their faces, as in Fig. 1, and several of the balls are left out to show the wires or rods that keep the rings in place. Fig. 7 is an edge view of one of the rings in Fig. 6. Fig. 8 shows a vertical section of the ring seen in Fig. 7. Fig. 9 is an edge view of an end ring of the set in Fig. 6. Fig. 10 represents one of the wires or rods mentioned in description of Fig. 6, enlarged. Fig. 11 is a perspective view of one of the bolsters placed on the rods between the rings to keep them apart, enlarged.

The case represented in Fig. 1 for holding the balls consists of a series of rings *a*, placed at a proper distance apart to receive a set of balls *d* between every two rings. These rings are placed in an inclined position, so that the top of each ring in the case, as shown in Fig. 1, will come over the space between that ring and the next one at the bottom. This is to make the balls travel in different paths on the bearing and bear on the whole surface instead of wearing in grooves, as is the way when the rings are placed in vertical position. The rings *a* are made concave on their faces or on both sides, so that when two are placed together with balls between them, as in Fig. 3, the concave faces will form a chamber to hold the balls, the edges *s* of the curved faces above and below the horizontal center line of the balls preventing them from escaping in either direction, though at the same time, the diameter of the balls being greater than the radial thickness of the rings, the balls will project beyond the outer and inner surfaces of the rings and bear on the surfaces of the bearing *h* and journal *r*.

In large bearings, where the inclination of the rings is small, and in all cases for the purpose of transportation, I prefer to use one or more wires or rods *p*, Fig. 10, extending through all the rings in succession, and placing collars or bolsters *h*, Fig. 11, between the rings on the rods, (see Fig. 6,) of proper length to hold the rings apart to allow the balls to move freely between them. The end rings *a*, Fig. 4, have their outer faces made radially square to the center line of the bearing; but their inner faces are made to correspond with the inclined face of the rings next to them, and are made concave in like manner, as described. These end rings are not positively necessary, as a set of the other rings screwed up properly on the rods with bolsters would keep their places; but the end washer enables me to bring the balls nearer to the end of the bearing, because it can be made quite thin on its narrowest side, (see Fig. 1, at *i*,) and the case has better support at its ends.

A modification of the shape of the ring is shown in Figs. 6 to 9. The main object is to make the balls travel over the whole surface of the bearing, and thus avoid making grooves therein. The less inclined the rings are, and yet not quite straight vertically, the nearer the paths of the different balls in the bearing will be to each other, and in some cases it may be best to have different degrees of inclination given to the rings in different parts of a circle, so that in some parts of a circle the balls will approach nearer a straight line than in others, and so that as the case turns in the bearing, with the balls at about one-half the speed the journal turns, at each alternate revolution the balls in the least inclined portion of the rings will be running over the paths of the balls in the greater inclined portion in the previous revolution and obliterate any marks between the paths that those balls may have made. By making the incline of one half of the rings the opposite of that on the other half, as in Fig. 7, in which the full lines represent a curve less inclined at the top, and the dotted lines $a'$ show a curve more inclined at the top and less on the lower half, so as to bring the paths of the less inclined row of balls, which paths lie nearer together over the paths of the more inclined row of balls, which are farther apart and roll over the spaces between the paths of the latter row of balls, the whole surface of the bearing will be equally affected by the action of the balls. It will readily be seen that these rings may be curved in shape and degree, as may be found necessary, if only the sides of two rings that face each other are parallel and leave a free space for the balls between them.

In Fig. 6 is shown a portion of a journal $p$ in elevation and part of the bearing or box $g$ in section to explain the relative positions of the parts.

The rings and bolsters can all be put on the rods in regular order and the ends of the rods screwed part way into the end ring. Then by pushing the rings all up toward one end the space between the end ring and the second one will be open sufficiently to admit the balls, and when that space is filled the second ring can be pushed down on the balls and the third space can be filled, and so on with all the rings until all the spaces are filled. The screw-rods are then turned in tight, and the case, with its balls, can be safely handled and transported. The object is to form a case with the balls that can be easily handled and put on the market as an article of manufacture to be disposed of to those who may wish to apply them to bearings on machines they are building or have already in operation.

Having thus described my improvements, I claim as my invention and desire to secure by Letters Patent—

1. As a new article of manufacture, a case to hold balls for use in a ball-bearing, constructed substantially as described—that is, of a series of rings placed in an inclined position across the line of center of the space which they surround, and one or more rods for holding the rings in position, substantially as described.

2. The combination of the concave-faced inclined rings $a$, rods $p$, bolsters $h$, end rings $a$, and balls $d$, substantially as described, and for the purpose set forth.

HENRY HOWARD.

Witnesses:
JAMES E. ARNOLD,
BENJ. ARNOLD.